(12) United States Patent
Iqbal et al.

(10) Patent No.: US 7,644,313 B2
(45) Date of Patent: Jan. 5, 2010

(54) METHOD, APPARATUS AND PROGRAM PRODUCT FOR A POINT-IN-TIME RECOVERY OF A COMPUTING SYSTEM

(75) Inventors: Mickey Iqbal, Atlanta, GA (US); Rajeev Puri, Charlotte, NC (US); H. Choong Thio, Palatine, IL (US)

(73) Assignee: International Business Machines Corporation, Armonk, NY (US)

( * ) Notice: Subject to any disclaimer, the term of this patent is extended or adjusted under 35 U.S.C. 154(b) by 383 days.

(21) Appl. No.: 11/353,745

(22) Filed: Feb. 14, 2006

(65) Prior Publication Data

US 2007/0220321 A1 Sep. 20, 2007

(51) Int. Cl.
*G06F 11/00* (2006.01)
(52) U.S. Cl. ...................................................... 714/38
(58) Field of Classification Search ...................... None
See application file for complete search history.

(56) References Cited

U.S. PATENT DOCUMENTS

| | | | |
|---|---|---|---|
| 5,513,112 A | | 4/1996 | Herring et al. |
| 5,768,566 A | * | 6/1998 | Harikrishnan et al. ....... 717/170 |
| 6,073,214 A | * | 6/2000 | Fawcett ....................... 711/133 |
| 6,161,218 A | * | 12/2000 | Taylor ......................... 717/174 |
| 6,363,499 B1 | * | 3/2002 | Delo et al. ..................... 714/15 |
| 6,484,186 B1 | | 11/2002 | Rungta |
| 7,137,034 B2 | | 11/2006 | Largman et al. |
| 2003/0167287 A1 | | 9/2003 | Forster |
| 2003/0200479 A1 | | 10/2003 | Bansemer |
| 2003/0226138 A1 | | 12/2003 | Luu |
| 2004/0034752 A1 | | 2/2004 | Ohran |
| 2004/0199910 A1 | | 10/2004 | Baack |
| 2004/0220980 A1 | | 11/2004 | Forster |
| 2004/0221024 A1 | | 11/2004 | Yamada et al. |
| 2006/0277433 A1 | * | 12/2006 | Largman et al. .............. 714/15 |

FOREIGN PATENT DOCUMENTS

WO WO 0101252 A1 1/2001

* cited by examiner

*Primary Examiner*—Michael C Maskulinski
(74) *Attorney, Agent, or Firm*—Arthur J. Samodovitz (57) ABSTRACT

A method for detecting a failure in a computing system and for restoring the system is provided. The method comprises providing a system connected to a network communications channel, creating, using a configured backup automation tool, a full system backup image and incremental archive logs of the system before attempting to remotely install software on the system and executing a point-in-time detection and restoration tool configured to detect a system failure when attempting to remotely install software on the system and, if the system failure is detected, to restore the system to a desired restoration point before the system failure occurred, using the full system backup image and incremental archive logs created of the system.

15 Claims, 6 Drawing Sheets

METHOD, APPARATUS AND PROGRAM PRODUCT FOR A POINT-IN-TIME RECOVERY OF A COMPUTING SYSTEM

FIELD OF THE INVENTION

The present invention relates to a method, apparatus and program product for a point-in-time recovery of a computing system. More particularly, the present invention relates to a method, apparatus and program product for detecting failure of a computing system when remotely installing software using an electronic software distribution tool and recovering the computing system to a point-in-time prior to the failure using a point-in-time detection and restoration tool in conjunction with an appropriately configured backup automation tool.

BACKGROUND OF THE INVENTION

In today's business environment, organizations and/or businesses utilize a variety of electronic software distribution tools to remotely install software on various platforms. When a workstation or server image becomes corrupted due to incorrect distribution of software and/or with installation of software, this could affect multiple systems simultaneously, thus, making it necessary to bring all of the affected systems back into operation with minimal or no data loss. As such, it has become imperative that organizations and/or businesses examine the efficiency and effectiveness in terms of resources consumed, such as, storage and/or memory required as well as time spent by personnel when attempting to recover workstation or server images when a system problem occurs within these organizations and/or businesses. Accordingly, there is a need to simplify the process of recovering data when there is a system problem and at the same time controlling any costs associated with such recovery.

SUMMARY OF THE INVENTION

In another aspect of the invention, there is provided a method for detecting a computing system failure in a computing system when attempting to remotely install software and for restoring the computing system. The method comprises the steps of providing a computing system connected to a network communications channel, creating, using a configured backup automation tool, a full system backup image and incremental archive logs of the computing system before attempting to remotely install software on the computing system and executing a point-in-time detection and restoration tool configured to detect a computing system failure in the computing system when attempting to remotely install software on the computing system and, if the system failure is detected, to restore the computing system to a desired restoration point before the system failure occurred, using the full system backup image and incremental archive logs created of the computing system. The method further comprises the steps of determining whether a correct version of the backup automation tool is installed, if the correct version of the backup automation tool is not installed, installing the correct version of the backup automation tool and configuring the backup automation tool, such that the point-in-time detection and restoration tool is able to restore the computing system to the desired restoration point. Preferably, the creating step comprises the steps of determining whether a full system backup image exists, and if the full system backup image does not exist, creating the full system backup image of the computing system using the configured backup automation tool. Further, preferably the configuring step comprises the steps of establishing a full system backup schedule and an incremental archive schedule specifying one or more hard disks that are critical for restoring the computing system and specifying one or more files on the one or more hard disks that are critical for restoring the computing system and monitoring activity pertaining to each of the one or more files and monitoring activity on the one or more hard disks on the computing system. Preferably, the monitoring activity step comprises the steps of monitoring the one or more files for any change and monitoring the one or more hard disks for any bit level changes. In a preferred embodiment, the at least one computing system comprises at least one of a workstation and/or a server and preferably the desired restoration point comprises at least one of a full system recovery, a point-in-time recovery or a last known good image recovery.

In one aspect of the invention, there is provided an apparatus for detecting a failure in a computing system and for restoring the computing system. The apparatus comprises at least one computing system connected to a network communications channel, an electronic software distribution tool coupled to the network communications channel and configured to remotely install software on the one computing system, a backup automation tool coupled to the network communications channel and configured to create a full system backup image and incremental archive logs of the one computing system and a point-in-time detection and restoration tool coupled to the network communications channel and configured to detect a failure in the one computing system when remotely installing software, using the electronic software distribution tool, on the one computing system and, if the failure is detected, to restore the one computing system to a desired restoration point before the failure occurred, using the full system backup image and any of the incremental archive logs created by the backup automation tool. Preferably the point-in-time detection and restoration tool further comprises a recovery configuration module configured to check whether a correct version of the backup automation tool is installed for creating the full system backup image and any of the incremental archive logs on the one computing system and, if the correct version of the backup automation tool is not installed, to install the correct version of the backup automation tool. Further, preferably. the point-in-time detection and restoration tool comprises a backup-archive scheduling module configured to schedule creation of the full system backup image and to schedule creation of the incremental archive logs of the at least one computing system and a specification module configured to specify one or more hard disks that are critical for restoring the one computing system and to specify one or more files on the one or more hard disks that are critical for restoring the one computing system. Furthermore, the point-in-time detection and restoration tool comprises a monitoring module configured to monitor activity pertaining to the one or more files and to monitor activity on the one or more hard disks. Preferably, the monitoring module is further configured to monitor for any changes in the one or more files on the one computing system and to monitor the one or more hard disks for any bit level changes. In a preferred embodiment, the desired restoration point comprises at least one of a full system recovery, a point-in-time recovery or a last known good image recovery. Furthermore, in a preferred embodiment, the one computing system comprises at least one of a workstation and/or a server.

In yet another aspect of the invention, there is provided a computer program product for detecting a system failure in a computing system when attempting to remotely install software and for restoring the computing system. The computer program product comprises a computer readable medium, first program instructions to determine whether a correct version of a backup automation tool is installed and, if the correct version of the backup automation tool is not installed, to install the correct version of the backup automation tool, second program instructions to create, using the backup automation tool, a full system backup image and incremental archive logs of the computing system before attempting to remotely install software on the computing system, third program instructions to detect the computing system failure in the computing system when attempting to remotely install the software, and fourth program instructions to restore the computing system to a desired restoration point before the system failure occurred, using the full system backup image and incremental archive logs created using the backup automation tool. The computer program product further comprises fifth program instructions to configure the computing system for remotely installing the software using an electronic software distribution tool. Preferably, the first, second, third, fourth and fifth program instructions are stored on the medium. In a preferred embodiment, the second program instructions comprise instructions to establish a full system backup schedule and an incremental archive schedule and to configure the backup automation tool for restoring the computing system to the desired restoration point. Further, preferably, the second program instructions comprise instructions to monitor activity pertaining to the one or more files that are specified as critical files and to monitor bit level changes in one or more hard disks that are specified as critical hard disks and to create the full system backup image based upon the full system backup schedule established and to create the incremental archive logs based upon the incremental archive schedule established. In a preferred embodiment, the desired restoration point comprises at least one of a full system recovery, a point-in-time recovery or a last known good image recovery and the at least one computing system comprises at least one of a workstation and/or a server.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides an apparatus for detecting a failure in a computing system and for restoring the computing system. The apparatus comprises at least one computing system connected to a network communications channel, an electronic software distribution tool coupled to the network communications channel and configured to remotely install software on the one computing system, a backup automation tool coupled to the network communications channel and configured to create a full system backup image and incremental archive logs of the one computing system and a point-in-time detection and restoration tool coupled to the network communications channel and configured to detect a failure in the one computing system when remotely installing software, using the electronic software distribution tool, on the one computing system and, if the failure is detected, to restore the one computing system to a desired restoration point before the failure occurred, using the full system backup image and any of the incremental archive logs created by the backup automation tool. Preferably the point-in-time detection and restoration tool further comprises a recovery configuration module configured to check whether a correct version of the backup automation tool is installed for creating the full system backup image and any of the incremental archive logs on the one computing system and, if the correct version of the backup automation tool is not installed, to install the correct version of the backup automation tool. Further, preferably. the point-in-time detection and restoration tool comprises a backup-archive scheduling module configured to schedule creation of the full system backup image and to schedule creation of the incremental archive logs of the at least one computing system and a specification module configured to specify one or more hard disks that are critical for restoring the one computing system and to specify one or more files on the one or more hard disks that are critical for restoring the one computing system. Furthermore, the point-in-time detection and restoration tool comprises a monitoring module configured to monitor activity pertaining to the one or more files and to monitor activity on the one or more hard disks. Preferably, the monitoring module is further configured to monitor for any changes in the one or more files on the one computing system and to monitor the one or more hard disks for any bit level changes. In a preferred embodiment, the desired restoration point comprises at least one of a full system recovery, a point-in-time recovery or a last known good image recovery. Furthermore, in a preferred embodiment, the one computing system comprises at least one of a workstation and/or a server.

As used herein, the term "computing system" or "system" refers to any computing system or device, such as, a workstation and/or a server and, preferably, refers to a plurality of computing systems that are connected via a network connection. Further, the term "software distribution tool" or "electronic software distribution tool" or "automated software distribution tool" refers to any electronic or automated software distribution tool or program that is used to remotely install software on a computing system via an network connection, such as, the electronic software distribution tool or program IBM Tivoli Configuration Manager that is commercially available from International Business Machines (IBM) and the commercially available electronic software distribution tool, Microsoft System Management Server (SMS) manufactured by Microsoft Corporation. Further, the term "backup automation tool" refers to any commercially available software for creating a full system backup of the system as well as for creating incremental archives of the system, such as, the IRR IBM Rapid Restore backup automation tool or program that is commercially available from International Business Machines (IBM) and the IBM Tivoli Storage Manager (TSM) backup automation tool, which is also commercially available from International Business Machines (IBM). Furthermore, the term "point-in-time detection and restoration tool" refers to a new program or code or tool for restoring a failed computing system to a desired restoration point before the system failure occurred. More preferably, the point-in-time detection and restoration tool is a program or code or tool that is used in conjunction with the electronic software distribution (ESD) tool and the backup automation tool (BAT) to restore the failed system to the desired restoration point before the system failure occurred. Additionally, as used herein, the term "backup" or "full system backup" or "last know good image" refers to the creation of a complete or full system backup image or the creation of a last known good image of a computing system. Further, the term "archives" or "incremental archives" or "incremental archive logs" refers to the backing up of smaller pieces or chunks of data, preferably, at pre-determined intervals before a complete or full system backup is or can be performed. Accordingly, the incremental archive logs can be aggregated to create a full system backup. Further, as used herein the term "restore" or "restoration" or "recovery" refers to restoring a failed computing system to a desired restoration point using a point-in-time detection and restoration tool in conjunction with an appropriately configured backup automation tool (BAT). Further, the term "desired restoration point" refers to any point in time before a failure occurs in a computing system. Additionally, the term "bit level changes" or "changes in the number of bits" refers to the number of change in bits in one or more hard disks every time there is a change in a bit from 0 to 1 or from 1 to 0.

Figure 1:
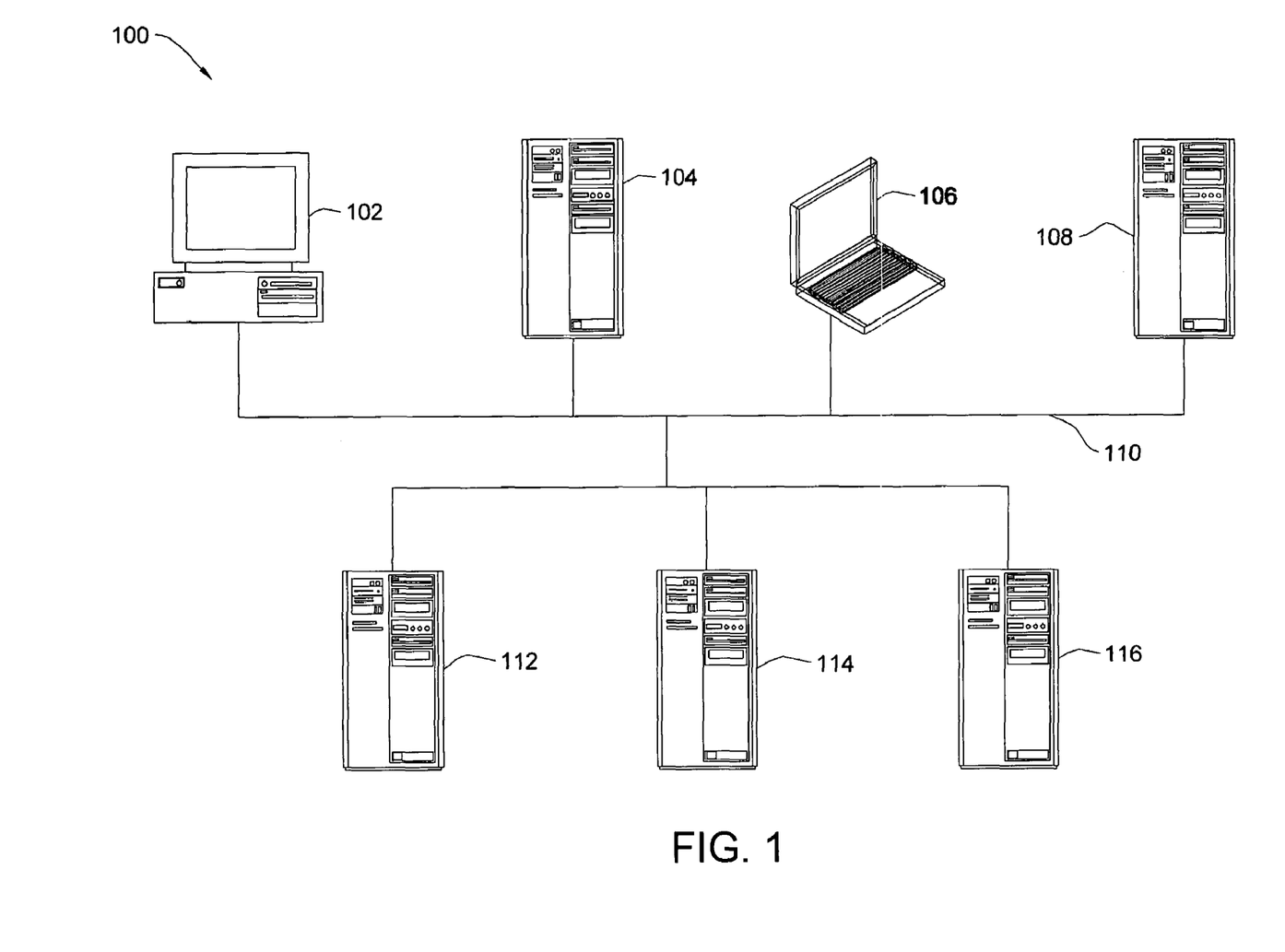
FIG. 1 is a schematic block system diagram illustrating a computer infrastructure that includes an apparatus for detecting a failure in a system when remotely installing software with an electronic software distribution (ESD) tool and for restoring a failed system by using a point-in-time detection and restoration tool in conjunction with an appropriately configured backup automation tool, in accordance with an embodiment of the invention.
Figure 2:
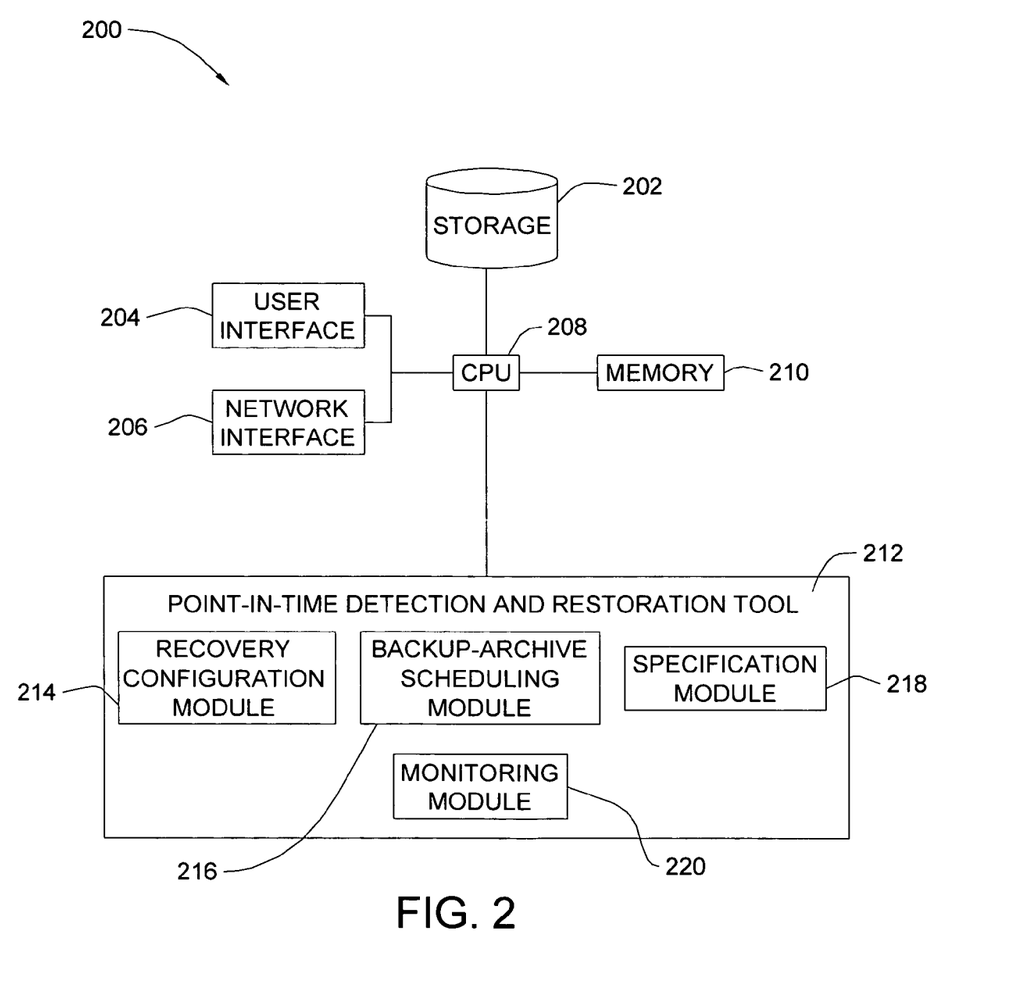
FIG. 2 is a schematic block system diagram illustrating a point-in-time detection and restoration tool in an apparatus for detecting a failure in a system when remotely installing software with an electronic software distribution (ESD) tool and for restoring the system by using the point-in-time detection and restoration tool, in accordance with an embodiment of the invention.

Reference is now made to FIGS. 1 and 2, which illustrate one embodiment of an apparatus for detecting and restoring a failed computing system using a point-in-time detection and restoration tool in combination with an appropriately configured backup automation tool, in accordance with an embodiment of the invention. FIG. 1 shows an embodiment of a computer infrastructure 100 that includes an apparatus for detecting and restoring a failed system using the point-in-time detection and restoration tool. Computer infrastructure 100 is only illustrative of various types of computer infrastructures for implementing the invention. For example, in one embodiment, computer infrastructure 100 comprises a plurality of computing systems or devices that communicate over a network to perform the various process steps of the invention. In particular, computer infrastructure 100 comprises workstations 102 and 106 and servers 104 and 108, each of which is connected to and is able to communicate over a network communications channel 110 to perform the various process steps of the invention. Further, the computer infrastructure 100 includes servers 112, 114 and 116, which are also connected to the network communications channel 110. The illustrated computer infrastructure 100 is similar to a local area network (LAN), and the network communications channel 110 may be, in one embodiment, an Ethernet communications channel, a wireless communications channel, or another equivalent communications channel. Turning to FIG. 1, in one embodiment, the server 112 has implemented thereon an electronic software distribution tool that is configured to remotely install software on any of the computing devices 102, 104, 106 and 108. Further, in one embodiment, the server 114 has implemented thereon a backup automation tool that is configured to create a full system backup image of each of the computing devices 102, 104, 106 and 108 as well as incremental archives of the computing devices 102, 104, 106 and 108. In addition, preferably, the server 116 has implemented thereon a point-in-time detection and restoration tool that is configured to detect a failure in any of the computing systems or devices 102, 104, 106 and/or 108 when remotely installing software on any one or more of these computing systems or devices 102, 104, 106 and/or 108 using an electronic or automated software distribution too. Further, if failure is detected on any of the computing systems or devices 102, 104, 106 and/or 108 by the point-in-time detection and restoration tool implemented on server 116, the point-in-time detection and restoration tool is further configured to restore any one of the failed computing systems or devices 102, 104, 106 and/or 108 to a desired restoration point before the failure occurred by using the full system backup image created by the backup automation tool implemented on server 114. Although, FIG. 1 depicts three separate servers 112, 114 and 116, where the electronic software distribution tool is installed on server 112, the backup automation tool is installed on server 114 and the point-in-time detection and restoration tool is installed on server 116, in an alternative embodiment, the electronic software distribution tool, the backup automation tool and the point-in-time detection and restoration tool may all be installed on a single server that is connected to the network communications channel 110.

Referring to FIG. 2, FIG. 2 depicts an embodiment of a computing system or device, for instance, a server 200 that includes a point-in-time detection and restoration tool 212, in accordance with an embodiment of the invention. The computing system or server 200 is only representative of various possible computing systems or devices that can include numerous combinations of hardware. To this extent, in other embodiments, computing system 200 as well as any of the computing devices 102, 104, 106, 108, 112 114 and/or 116 in FIG. 1 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. As shown in FIG. 2, preferably, the computing system 200 includes a central processing unit (CPU)

208, a local storage device 202, a user interface 204, a network interface 206, a computer readable memory 210, and a point-in-time detection and restoration tool or component 212. The CPU 208 is configured generally to execute computer program instructions/operations stored in storage 202 via memory 210 within the computing system 200. The processing unit 208 may comprise a single processing unit, or be distributed across one or more processing units in one or more locations, e.g., on a client and a server. The user interface 204, in one embodiment, is configured to allow a user to interact with the computing system 200, including allowing input data and commands from a user and communicating output data to the user. The network interface 206 is configured, in one embodiment, to facilitate network communications of the computing system 200 over the communications channel 110 of the computer infrastructure 100. Similarly, the local memory 210 on the server 200 and/or the storage system 202 on the server 200 can comprise any combination of various types of data storage that reside at one or more physical locations. To this extent, the storage system 202 could include one or more storage devices, such as a magnetic disk drive or an optical disk drive. Although not shown in FIG. 2, additional components, such as cache memory, communication systems, system software, etc., may be incorporated into the computing system 200.

Further, in one embodiment, the computing system 200, preferably, comprises a point-in-time detection and restoration tool or code or component 212 that comprises several modules, including a recovery configuration module 214, a backup-archive scheduling module 216, a specification module 218 and a monitoring module 220. Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

As shown in FIG. 2, the point-in-time detection and restoration tool 212 included in the computing system 200 is provided with a logic unit containing a plurality of modules 214, 216, 218 and 220 that are configured to functionally execute the necessary steps of detecting a failure in the computing system 200 and of restoring the computing system 200 when a failure is detected. In a preferred embodiment, the recovery configuration module 214 checks whether a correct version of the backup automation tool is installed on the computer infrastructure 100 for creating a full system backup image and for creating incremental archives of the computing system 200. In a preferred embodiment, the backup-archive scheduling module 216 schedules a full system backup and also schedules any incremental archives for the computing system 200. Further, in a preferred embodiment, the specification module 218 specifies one or more hard disks on the computing system 200 that are critical for restoring the computing system 200 and, in addition, specifies one or more files on the one or more hard disks on the computing system 200 that are critical for restoring the computing system 200. Additionally, in a preferred embodiment, the monitoring module 220 monitors activity pertaining to the one or more files as well as monitors activity on the one or more hard disks on the computing system 200. Preferably, the monitoring module 220 monitors for any changes in the one or more files on the computing system 200 and monitors the one or more hard disks on the computing system 200 for any bit level changes, as will be described in detail with respect to FIG. 4, herein below.

In another embodiment, the present invention provides a method for detecting a computing system failure in a computing system when attempting to remotely install software and for restoring the computing system. The method comprises the steps of providing a computing system connected to a network communications channel, creating, using a configured backup automation tool, a full system backup image and incremental archive logs of the computing system before attempting to remotely install software on the computing system and executing a point-in-time detection and restoration tool configured to detect a computing system failure in the computing system when attempting to remotely install software on the computing system and, if the system failure is detected, to restore the computing system to a desired restoration point before the system failure occurred, using the full system backup image and incremental archive logs created of the computing system. The method further comprises the steps of determining whether a correct version of the backup automation tool is installed, if the correct version of the backup automation tool is not installed, installing the correct version of the backup automation tool and configuring the backup automation tool, such that the point-in-time detection and restoration tool is able to restore the computing system to the desired restoration point. Preferably, the creating step comprises the steps of determining whether a full system backup image exists, and if the full system backup image does not exist, creating the full system backup image of the computing system using the configured backup automation tool. Further, preferably the configuring step comprises the steps of establishing a full system backup schedule and an incremental archive schedule specifying one or more hard disks that are critical for restoring the computing system and specifying one or more files on the one or more hard disks that are critical for restoring the computing system and monitoring activity pertaining to each of the one or more files and monitoring activity on the one or more hard disks on the computing system. Preferably, the monitoring activity step comprises the steps of monitoring the one or more files for any change and monitoring the one or more hard disks for any bit level changes. In a preferred embodiment, the at least one computing system comprises at least one of a workstation and/or a server and preferably the desired restoration point comprises at least one of a full system recovery, a point-in-time recovery or a last known good image recovery.

Figure 3:
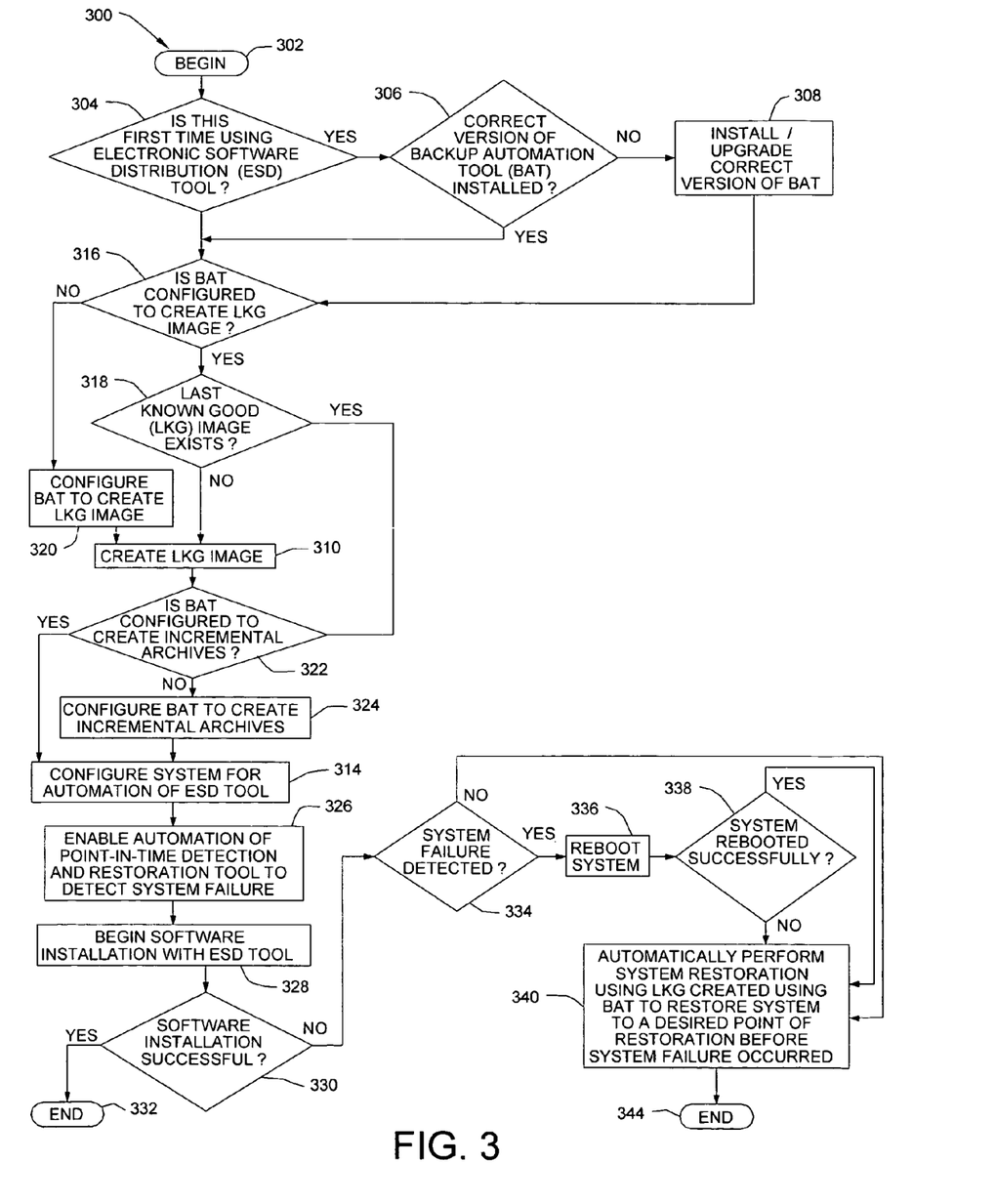
FIG. 3 is an illustration of a flowchart depicting a method for detecting a failure in a system when remotely installing software and for restoring the system by using an appropriately configured backup automation tool, in accordance with an embodiment of the invention.

Reference is now made to FIGS. 3 through 6, which illustrate a method of detecting a system failure in a computing system when attempting remote software installation with an electronic software distribution tool and for restoring the computing system by using the point-in-time detection and restoration tool in conjunction with an appropriately configured backup automation tool, in accordance with an embodiment of the invention. As shown in FIG. 3, the method 300 begins at step 302 with a determination being made in step 304 as to whether or not software is being installed remotely on a system using an electronic software distribution (ESD) tool for the first time. In a preferred embodiment, the electronic software distribution (ESD) tool is run first, such that the electronic software distribution (ESD) tool is able to make a determination as to whether or not the electronic software distribution (ESD) tool is being used for the first time. Preferably, as mentioned earlier, the electronic software distribution (ESD) tool may be any commercially available electronic software distribution (ESD) tool, such as, IBM's Tivoli Configuration Manager software distribution tool or Microsoft's System Management Server (SMS) software distribution tool or may be any other software distribution tool available on the market for remotely installing software on a system. Referring to FIG. 3, if it is determined in step 304 that it is the first time that the electronic software distribution (ESD) tool is being used to install software remotely, then in step 306 a determination is made by the electronic software distribution (ESD) tool as to whether or not a correct version of a backup automation tool (BAT) is installed. If it is determined in step 306 that a correct version of the backup automation tool (BAT) is not installed, then a correct version of the backup automation tool (BAT) is installed in step 308 or, alternatively, if an older version of the backup automation tool (BAT) is found in step 306, then the older version is upgraded with the correct version of the backup automation tool (BAT) in step 308. However, if the correct version of the backup automation tool (BAT) is found installed in step 306, or if it is determined in step 304 that it is not the first time that the electronic software distribution (ESD) tool is being used to remotely install software, then a determination is made in step 316 as to whether or not the backup automation tool (BAT) is configured as desired to create a last known good (LKG) image, which is further explained herein below with respect to FIGS. 4 and 5. If it is determined in step 316 that the backup automation tool (BAT) is not configured, then in step 320 the backup automation tool (BAT) is configured as desired to create a last known good (LKG) image. On the other hand, if in step 316 the backup automation tool (BAT) is determined to be configured, then a determination is made in step 318 as to whether or not a last known good (LKG) image or a full system backup image exists. If it is determined in step 318 that a last known good (LKG) image or a full system backup image does not exist, or after configuring the backup automation tool (BAT) in step 320, a last known good (LKG) image is created in step 310 using the backup automation tool (BAT). If a last known good (LKG) image exists in step 318 or after a last known good (LKG) image is created in step 310, a determination is made in step 322 whether or not the backup automation tool (BAT) has been configured as desired to create incremental archives, as further explained herein below with respect to FIGS. 4 and 5. If the backup automation tool (BAT) is not configured as desired to create incremental archives in step 322, then the backup automation tool (BAT) is configured as desired in step 324 to create, preferably, at pre-determined intervals, incremental archives or incremental archive logs of the computing system. On the other hand, if in step 322, it is determined that the backup automation tool (BAT) is configured as desired, and/or after the backup automation tool (BAT) is configured to create incremental archives in step 324, then in step 314, the computing system is configured to perform the remote installation of the software using the electronic software distribution (ESD) tool before enabling the automation of the point-in-time detection and restoration tool to detect any system failure in step 326. In a preferred embodiment, the electronic software distribution (ESD) tool calls and enables the point-in-time detection and restoration tool in step 326. Once the point-in-time detection and restoration tool for automatically detecting system failure and automatically performing system restoration is enabled in step 326, the installation of software using the electronic software distribution (ESD) tool is begun in step 328. In step 330, a determination is made as to whether or not the software installation was successful. If the software installation is successful, the process ends at step 332. However, if the software installation was unsuccessful, the point-in-time detection and restoration tool determines whether or not a system failure is detected in step 334. If a system failure is not detected in step 334, the point-in-time detection and restoration tool performs an automatic restoration of the system in step 340, as explained herein below. If a system failure is detected in step 334, the point-in-time detection and restoration tool reboots the system in step 336. The point-in-time detection and restoration tool checks to determine whether or not the system was rebooted successfully in step 338. If the system is not booted successfully, the point-in-time detection and restoration tool automatically performs in step 340 a system restoration of the failed system using the last known good (LKG) image created using the backup automation tool (BAT) in order to restore the system to a desired point of restoration before the system failure occurred. Preferably, the desired point of restoration is an option that is either selected by a user or is a configurable parameter that is set forth in the electronic software distribution (ESD) tool, and is further explained herein below with respect to FIG. 6. Accordingly, every time software is installed on a computing device, the process described herein above in FIG. 3 is performed, such that if a system failure is detected, the failed system can be restored to a desired restoration point before the system failure occurred.

Figure 4:
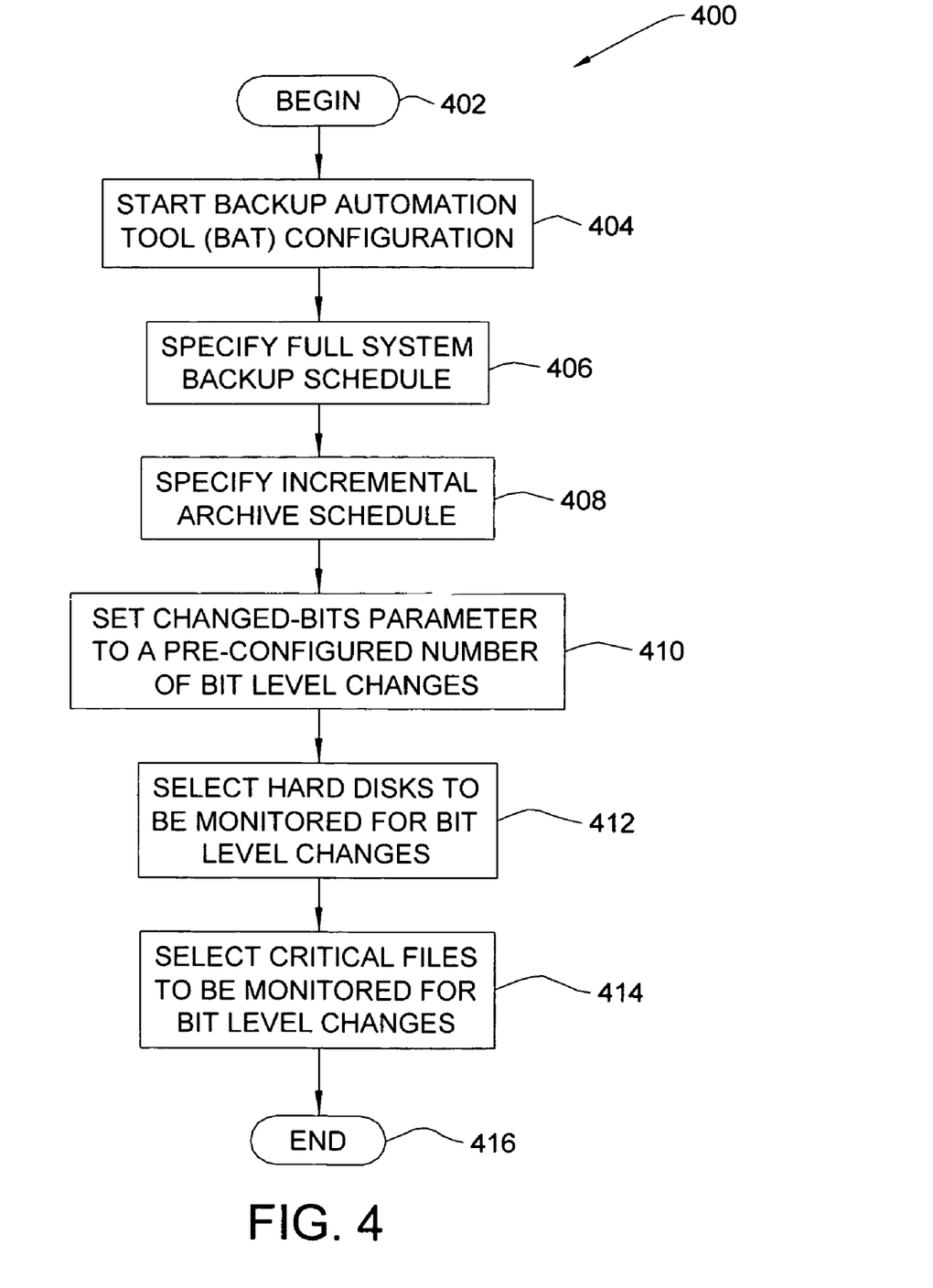
FIG. 4 is an illustration of a flowchart depicting a method for appropriately configuring a backup automation tool for restoring a failed system to a desired restoration point, in accordance with an embodiment of the invention.
Figure 5:
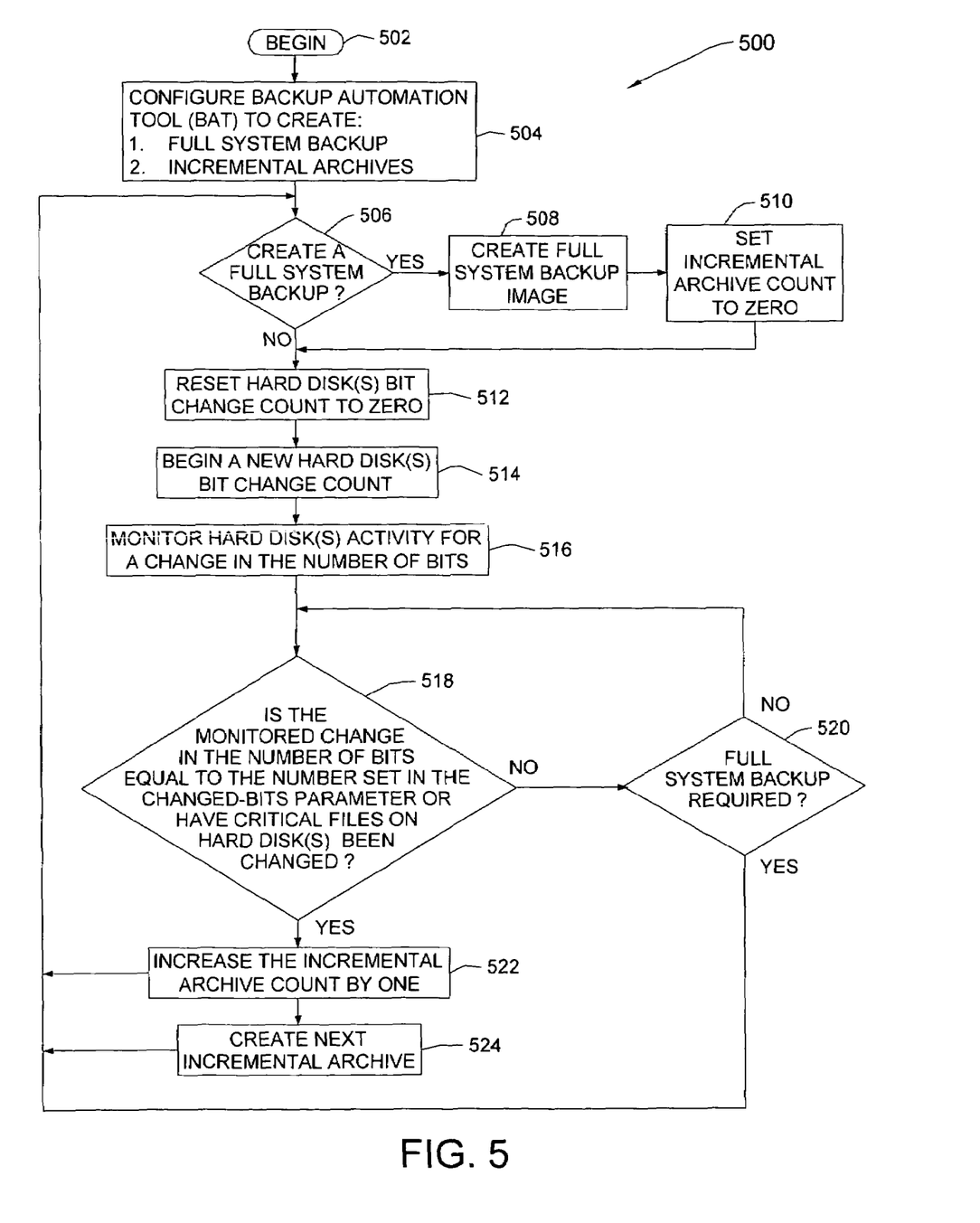
FIG. 5 is an illustration of a flowchart depicting a method for performing a full system backup image and for performing incremental archives by using an appropriately configured backup automation tool, in accordance with an embodiment of the invention.

Referring to FIGS. 4 and 5, in FIG. 4, reference numeral 400 depicts a flowchart showing a method of configuring the backup automation tool (BAT) to create a full system backup and to create incremental archives, in accordance with an embodiment of the invention. The configuring process begins at step 402 with the starting of the backup automation tool (BAT) configuration in step 404 for selecting options for the creation of a full system backup image and for creating incremental archives. In particular, the configuration process includes specifying a full system backup schedule in step 406 as to how often a complete backup of the system should be performed. For instance, a full system backup could be setup such that a full system backup is carried out once a day, once a week, etc. Further, the configuration process includes specifying the incremental archive schedule in step 408. Again, for instance, the incremental archive schedule could be setup such that an incremental archive log is created every hour or every few hours, etc. Further, the method includes setting the changed-bits parameter in step 410 to a pre-configured or pre-determined number of bit level changes, such that the backup automation tool (BAT) is able to monitor or track for changes in bits. For instance, the changed-bits parameter can be set to 50 k or 60 k, etc., as explained further herein below with respect to FIG. 5. Furthermore, the method includes selecting in step 412 hard disks to be monitored for bit level changes and selecting one or more critical files to be monitored for bit level changes in step 414, before ending the configuration process at step 416.

Reference is now made to FIG. 5, which depicts a flowchart 500 showing a method of creating a full system backup and of creating incremental archives, using a backup automation tool (BAT) that has been configured, in accordance with an embodiment of the invention. Starting at step 502, the method begins with configuring the backup automation tool (BAT) to create a full system backup and to create incremental archives in step 504 as set forth in FIG. 4. Once the backup automation tool (BAT) has been configured as desired, the method continues in step 506 where a determination is made as to whether a full system backup is to be created, based on the schedule set forth in step 406 of FIG. 4. If a full system backup is to be created in step 506, then in step 508 a full system backup image is created and the incremental archive count is set to zero in step 510. On the other hand if a full system backup does not have to be created in step 506, the bit change count for the hard disk or disks is set to zero in step 512. The method further continues in step 514 with beginning a new bit change count for the hard disk or disks. The method further includes monitoring in step 516 the hard disk or disks for activity for a change in the number of bits, namely, for any bit level changes, as specified in step 410 of FIG. 4. Further, in step 518, a determination is made as to whether the monitored change in the number of bits is equal to the number set in the changed-bits parameter in step 410 of FIG. 4 or whether there has been any changes in the critical files specified on the hard disks, as specified in steps 412 and 414 of FIG. 4. If the monitored change in the number of bits is not equal to the number set in the changed-bits parameter or if the critical files specified on the hard disks have not been changed, then a determination is made as to whether a full system backup is required in step 520. If a full system backup is not required in step 520, then the process loops back to step 518 to determine whether the monitored change in the number of bits is equal to the number set in the changed-bits parameter or if the critical files specified on the hard disks have been changed. However, if the monitored change in the number of bits is equal to the number set in the changed-bits parameter or if the critical files specified on the hard disks have been changed in step 518, the incremental archive count is increased by one in step 522 and the next incremental archive is created in step 524, by going back to step 506 to determine if a full system backup is to be created and the process repeats itself. Preferably, the backup automation tool (BAT) is configured to create a full system backup as well as to create incremental archives based upon changes in bit levels of the hard disk or disks and the associated files that are impacted by these changed bits. For instance, if the changed-bits parameter for measuring bit level changes (that is, a change in the number of bits on the hard disk or disks) is set to a pre-configured number of 50 k and if certain hard disk or disk and associated files are selected as being critical when monitoring the registry, then every time there is a change in only one bit in any of the critical files on the specified hard disk or disks that impact the registry, an incremental archive will be created. However, if there is a change in one or more bits in a non-critical file, then no new incremental archive is created, unless the total number of bits that have changed equals 50 k, as set forth in the changed-bits parameter in this instance. The 50 k size is configurable and can be set to any size based on the technical requirements of the system that uses the recovery process of this invention.

Figure 6:
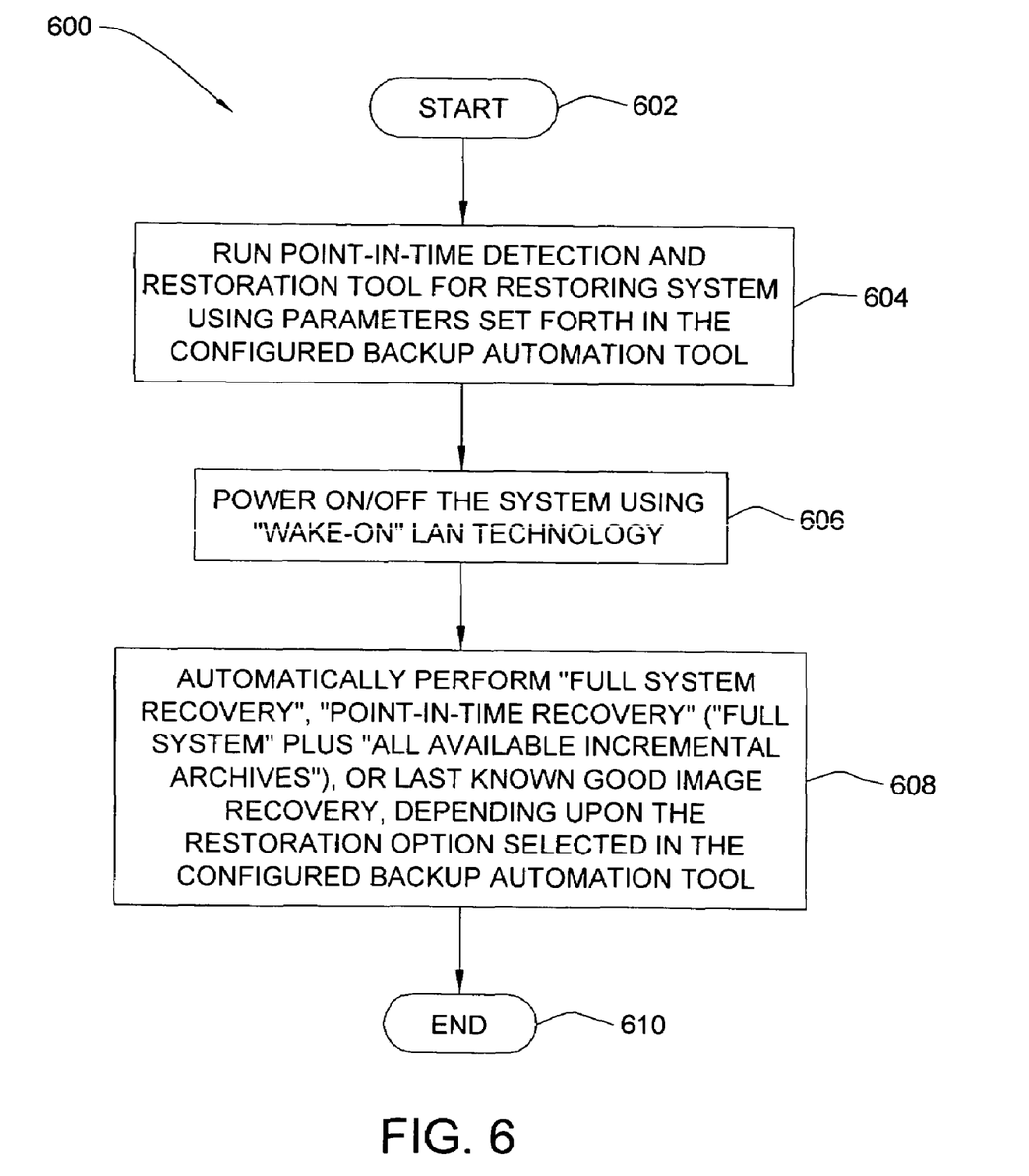
FIG. 6 is an illustration of a flowchart depicting a method for automatically restoring a system that has failed when remotely installing software with an electronic software distribution (ESD) tool by using the point-in-time detection and restoration tool in conjunction with an appropriately configured backup automation tool, in accordance with an embodiment of the invention.

Turning to FIG. 6, reference numeral 600 depicts the process of automatically performing a system restoration when a system failure occurs due to unsuccessful installation of software (as set forth in step 340 of FIG. 3). The process starts at step 602 by running in step 604 the point-in-time detection and restoration tool for restoring a system that has experienced system failure. Preferably, the system is restored using the backup automation tool (BAT) that has been configured as described in FIG. 4 when remote installation of software using the electronic software distribution (ESD) tool was unsuccessful. In particular, the restoration process uses in step 606 a "wake-on" LAN technology for powering on/off the system that has failed. After the system has been powered on/off in step 606, the point-in-time detection and restoration tool automatically performs restoration in step 608 to restore the system to a desired point of restoration. Preferably, the desired point of restoration is chosen from one of three options, namely, a full system recovery, a point-in-time recovery (full system recovery plus all available incremental archives or a last known good (LKG) image recovery. The desired point of restoration, in a preferred embodiment, is set forth or selected when configuring the backup automation tool (BAT). Alternatively, the desired point of restoration can be set forth or selected at the time the restoration process is kicked off. A full system recovery refers to when a system (for example, a workstation or a server) that has earlier experienced a failure resulting in complete or partial data loss is recovered to exactly the same state as which it was in at the instant in time after which the failure happened. A point-in-time recovery refers to when a system that has earlier experienced a failure resulting in complete or partial data loss is recovered to a specific state that corresponds to a specific time before the failure occurred. For instance, the system is recovered to a state corresponding to a state the system was in 10 minutes prior to the failure, or recovered to a state the system was in 24 hrs prior to the failure, etc. A last known good image recovery refers to that backup copy of the full system backup image, which was created at the time when the most recent full system backup image was performed. The latter could be minutes, hours, days, or weeks before the system failure occurs. When the system restoration process is limited to simply restoring the last known good image (irrespective of how far back in time that backup was taken prior to the system failure), then that restoration process is referred to as the last known good image recovery. Accordingly, after the point-in-time detection and restoration tool has performed the restoration of the system to the desired point of restoration, that is, any one of the three options described above, the process ends at step 610.

In yet another embodiment, the present invention provides a computer program product for detecting a system failure in a computing system when attempting to remotely install software and for restoring the computing system. The computer program product comprises a computer readable medium, first program instructions to determine whether a correct version of a backup automation tool is installed and, if the correct version of the backup automation tool is not installed, to install the correct version of the backup automation tool, second program instructions to create, using the backup automation tool, a full system backup image and incremental archive logs of the computing system before attempting to remotely install software on the computing system, third program instructions to detect the computing system failure in the computing system when attempting to remotely install the software, and fourth program instructions to restore the computing system to a desired restoration point before the system failure occurred, using the full system backup image and incremental archive logs created using the backup automation tool. The computer program product further comprises fifth program instructions to configure the computing system for remotely installing the software using an electronic software distribution tool. Preferably, the first, second, third, fourth and fifth program instructions are stored on the medium. In a preferred embodiment, the second program instructions comprise instructions to establish a full system backup schedule and an incremental archive schedule and to configure the backup automation tool for restoring the computing system to the desired restoration point. Further, preferably, the second program instructions comprise instructions to monitor activity pertaining to the one or more files that are specified as critical files and to monitor bit level changes in one or more hard disks that are specified as critical hard disks and to create the full system backup image based upon the full system backup schedule established and to create the incremental archive logs based upon the incremental archive schedule established. In a preferred embodiment, the desired restoration point comprises at least one of a full system recovery, a point-in-time recovery or a last known good image recovery and the at least one computing system comprises at least one of a workstation and/or a server.

In a preferred embodiment, the computer readable medium comprises both a computer storage medium and a network medium. Preferably, the computer storage medium includes semiconductor memory, magnetic disk, magnetic tape, compact disc (CD), read-only memory (ROM), and/or digital video disc (DVD) and the network medium comprises transmission devices on a network, such as, cables, routers, switches and/or network adapter cards. Accordingly, the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general purpose microprocessor, the computer program code segments configure the microprocessor to create specific logic circuits. One skilled in the art would appreciate that a set of programmable instructions executed by a processor of the system are required for performing the process steps of the inventive system and method described above.

For instance, customized software applications or programs can be developed for a particular business process to perform any or all of the functions carried out by the point-in-time detection and restoration tool (such as, monitoring/detecting, restoring, etc.) and to perform any of the functions carried out by the configured backup automation tool (such as, creating a full system backup and incremental archives). Similarly, any data gathered by the point-in-time detection and restoration tool can be stored on some storage medium, preferably, on a server. Moreover, the process for detecting and restoring a failed system can include a human resource component, that is, can include people that are decision makers. The human component may oversee any determinations/decisions made by the point-in-time detection and restoration tool with respect to restoring a failed system and can manually override any such decisions, preferably, by using a computer program that provides various screen displays to help enable the human component to override any decisions as to restoring a failed system. Further, a human component can input an override decision with respect to restoring a failed system by using an input device, such as a keyboard.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method for managing a computer system including a hard disk which stores a plurality of files, the method comprising the steps of:
    a programmed CPU repeatedly conducting a full backup of the computer system based on a predetermined schedule, and between successive full backups, conducting an incremental backup of the computer system in response to a predetermined number of bits of data on the hard disk having changed since a last full backup or any bit of data in a predetermined one of the files on the hard disk having changed since the last full backup,
    a programmed CPU subsequently attempting to install software in the computer system, and if the installation is not successful,
        if there was no system failure of the computer system during the software installation, a programmed CPU restoring the computer system based on a last full backup of the computer system and an incremental backup, if any, of the computer system since the last full backup of the computer system, and
        if there was a system failure of the computer system during the software installation, rebooting the computer system and after the rebooting, a programmed CPU restoring the computer system based on a last full backup of the computer system and an incremental backup, if any, of the computer system since the last full backup of the computer system.

2. The method of claim 1 further comprising the prior step of the programmed processor receiving user input designating the one file as critical to restoring the computer system.

3. The method of claim 1 further comprising the prior step of the programmed processor receiving user input designating the hard disk as critical to restoring the computer system.

4. The method of claim 1 wherein the step of a programmed CPU subsequently attempting to install software in the computer system is controlled remotely.

5. The method of claim 1 wherein the hard disk comprises multiple storage disks in a hard disk drive.

6. A computer program product for managing a computer system including a hard disk which stores a plurality of files, the computer program product comprising:
    a computer readable storage media;
    first program instructions to repeatedly conduct a full backup of the computer system based on a predetermined schedule, and between successive full backups, conduct an incremental backup of the computer system in response to a predetermined number of bits of data on the hard disk having changed since a last full backup or any bit of data in a predetermined one of the files on the hard disk having changed since the last full backup;

second program instructions to subsequently attempt to install software in the computer system, and if the installation is not successful, if there was no system failure of the computer system during the software installation, restore the computer system based on a last full backup of the computer system and an incremental backup, if any, of the computer system since the last full backup of the computer system, and if there was a system failure of the computer system during the software installation, after a rebooting of the computer system, restore the computer system based on a last full backup of the computer system and an incremental backup, if any, of the computer system since the last full backup of the computer system; and wherein the first and second program instructions are stored on the computer readable storage media.

7. The computer program product of claim 6 further comprising third program instructions to receive user input designating the one file as critical to restoring the computer system; and wherein the third program instructions are stored on the computer readable storage media.

8. The computer program product of claim 6 further comprising third program instructions to receive user input designating the hard disk as critical to restoring the computer system; and wherein the third program instructions are stored on the computer readable storage media.

9. The computer program product of claim 6 wherein the second program instructions are controlled remotely.

10. The computer program product of claim 6 wherein the hard disk comprises multiple storage disks in a hard disk drive.

11. A computer system for managing a computer system including a hard disk which stores a plurality of files, the computer system comprising:

a CPU, a computer readable memory and a computer readable storage media;

first program instructions to repeatedly conduct a full backup of the computer system based on a predetermined schedule, and between successive full backups, conduct an incremental backup of the computer system in response to a predetermined number of bits of data on the hard disk having changed since a last full backup or any bit of data in a predetermined one of the files on the hard disk having changed since the last full backup;

second program instructions to subsequently attempt to install software in the computer system, and if the installation is not successful, if there was no system failure of the computer system during the software installation, restore the computer system based on a last full backup of the computer system and an incremental backup, if any, of the computer system since the last full backup of the computer system, and if there was a system failure of the computer system during the software installation, after a rebooting of the computer system, restore the computer system based on a last full backup of the computer system and an incremental backup, if any, of the computer system since the last full backup of the computer system; and wherein the first and second program instructions are stored on the computer readable storage media for execution by the CPU via the computer readable memory.

12. The computer system of claim 11 further comprising third program instructions to receive user input designating the one file as critical to restoring the computer system; and wherein the third program instructions are stored on the computer readable storage media for execution by the CPU via the computer readable memory.

13. The computer system of claim 11 further comprising third program instructions to receive user input designating the hard disk as critical to restoring the computer system; and wherein the third program instructions are stored on the computer readable storage media for execution by the CPU via the computer readable memory.

14. The computer system of claim 11 wherein the second program instructions are controlled remotely.

15. The computer system of claim 11 wherein the hard disk comprises multiple storage disks in a hard disk drive.

* * * * *

UNITED STATES PATENT AND TRADEMARK OFFICE
CERTIFICATE OF CORRECTION

| | | |
|---|---|---|
| PATENT NO. | : 7,644,313 B2 | Page 1 of 1 |
| APPLICATION NO. | : 11/353745 | |
| DATED | : January 5, 2010 | |
| INVENTOR(S) | : Iqbal et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 514 days.

Signed and Sealed this

Sixteenth Day of November, 2010

David J. Kappos
*Director of the United States Patent and Trademark Office*